United States Patent
Crane et al.

(10) Patent No.: US 6,510,236 B1
(45) Date of Patent: Jan. 21, 2003

(54) AUTHENTICATION FRAMEWORK FOR MANAGING AUTHENTICATION REQUESTS FROM MULTIPLE AUTHENTICATION DEVICES

(75) Inventors: Michael A. Crane, Austin, TX (US); Ivan Matthew Milman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/210,093

(22) Filed: Dec. 11, 1998

(51) Int. Cl.[7] .................................................. G06K 9/00
(52) U.S. Cl. ........................ 382/116; 713/186; 713/201
(58) Field of Search ................................ 382/115–127; 356/71; 713/185, 186, 201; 340/5.52–5.54, 5.81–5.85; 902/3, 6; 707/6

(56) References Cited

U.S. PATENT DOCUMENTS

| | | | |
|---|---|---|---|
| 556,000 A | 3/1896 | Bramer et al. | |
| 5,237,614 A | 8/1993 | Weiss | 380/23 |
| 5,291,560 A | 3/1994 | Duagman | 382/2 |
| 5,347,580 A | 9/1994 | Molva et al. | 380/25 |
| 5,544,322 A | 8/1996 | Cheng et al. | 395/200.12 |
| 5,615,277 A | 3/1997 | Hoffman | 382/115 |
| 5,689,708 A | 11/1997 | Regnier et al. | 395/682 |
| 5,706,349 A | 1/1998 | Aditham et al. | 380/25 |
| 5,706,427 A | 1/1998 | Tabuki | 395/187.01 |
| 5,732,137 A | 3/1998 | Aziz | 380/25 |
| 5,740,361 A | 4/1998 | Brown | 395/187.01 |
| 5,761,309 A | 6/1998 | Ohashi et al. | 380/25 |
| 5,778,065 A | 7/1998 | Hauser et al. | 380/21 |
| 5,784,463 A | 7/1998 | Chen et al. | 380/21 |
| 5,784,464 A | 7/1998 | Akiyamo et al. | 380/25 |
| 5,784,566 A * | 7/1998 | Viavant et al. | 395/200.59 |
| 5,841,970 A * | 11/1998 | Tabuki | 395/187.01 |
| 6,087,955 A * | 7/2000 | Gray | 340/825.34 |

FOREIGN PATENT DOCUMENTS

| | | |
|---|---|---|
| JP | 1049495 | 7/1996 |
| JP | 0154977 | 11/1996 |
| WO | 9827688 | 12/1997 |

OTHER PUBLICATIONS

IBM Technical Disclosure Bulletin (Dec. 1997), vol. 40, No. 12, pp. 65–72.
IBM Technical Disclosure Bulletin (Oct. 1997), vol. 40, No. 10, pp. 99–100.

* cited by examiner

*Primary Examiner*—Brian Werner
(74) *Attorney, Agent, or Firm*—Jeffrey S. LaBaw; Joseph R. Burwell; David H. Judson

(57) ABSTRACT

An authentication framework for authenticating clients, each of which is coupled to an authentication device of one of a plurality of permitted authentication device types. An authentication method begins by having a client pass to an application server a request for authentication. The request includes a user id and device id identifying a client and an authentication device coupled thereto. The application server determines which device authentication server the request is intended for, and then forwards authentication data in the request to that server. If the device authentication server verifies that the authentication data is acceptable, an authorization token is returned to the client.

24 Claims, 2 Drawing Sheets

AUTHENTICATION FRAMEWORK FOR MANAGING AUTHENTICATION REQUESTS FROM MULTIPLE AUTHENTICATION DEVICES

BACKGROUND OF THE INVENTION

1. Technical Field

The present invention relates generally to the field of distributed computer networks and, in particular, to providing an authentication framework for use in authenticating clients having a plurality of permitted authentication device types.

2. Description of the Related Art

It is commonplace today for computer users to connect their machines to other computers, known as "servers," throughout a network. The network may be a private network, such as a corporate intranet of networked computers that is accessible only to computer users within that corporation, or it may be a public network, such as the Internet. The Internet is a vast collection of computing resources, interconnected as a network, from sites around the world.

A user may connect his computer to a server using a "wireline" connection or a "wireless" connection. Wireline connections are those that use physical media such as cables or telephone lines, whereas wireless connections use media such as satellite links, radio frequency waves, and infrared waves. Many connection techniques can be used with these various media, including: using the computer's modem to establish a connection over a telephone line; using a local area network (LAN) card such as Token Ring or Ethernet; using a cellular modem to establish a wireless connection, and the like. The user's computer may be any type of computer processor having processing and communication capabilities. Traditionally, such devices include desktop, laptop and handheld computers.

Conventional user id and password schemes for controlling user access to network resources are well-known. Recently, it has been proposed to provide client workstations in a network with so-called "alternative" authentication devices for access control purposes. Such devices include, for example, "token cards" and "biometric" (e.g., finger, eye or voice print) scanners. Representative token card systems are available commercially from Security Dynamics (SecureID™) and Axent (Defender™). Numerous third parties provide biometric scanning systems. A representative patent illustrating a biometric personal identification system based on iris analysis is U.S. Pat. No. 5,291,560. While these devices provide significant advantages, each authentication device vendor has a different way of encoding input information and validating the user's identity. Thus, it has not been possible to enable existing client/server and Internet-based applications to incorporate such alternate authentication devices into their current authentication schemes without compromising server trust policies.

The present invention solves this problem.

BRIEF SUMMARY OF THE INVENTION

An object of the present invention is to provide an authentication framework for use in authenticating clients having a plurality of permitted authentication device types.

Another object of this invention is to provide an authentication architecture that enables client-server and Internet-based applications to use alternate authentication devices, e.g., token cards and biometric devices.

It is a more specific object to provide an application server with the capability of managing authentication request traffic from a variety of clients having disparate authentication devices or schemes.

A still further object of this invention is to enable the application server to manage such authentication request traffic without having to verify specific authentication device data, which typically varies depending on the device type and vendor.

Yet another object of this invention is to provide an architecture by which current and future applications may support varied authentication devices without necessarily having to be rewritten.

Still another more general object of this invention is to provide a pluggable framework for authentication services.

In the preferred embodiment, the authentication framework of the present invention has three (3) basic elements. First, a given application client has an authentication device attached to it, and the device is one of a plurality of permitted authentication device types. Thus, for example, the device is a token card or a biometric reader. Second, an application server of the framework knows what types of devices and servers it trusts. Third, given device authentication servers merely verify that authentication device data is acceptable for authentication. The device authentication servers may comprise part of the framework or operate in association with the framework.

In operation, each given application client passes to the application server a request for authentication. The request includes a user id and device id identifying a respective client and an authentication device coupled thereto. The application server (if it trusts the device and has support for it) determines which device authentication server the request is intended, and then routes given authentication data to that server. If the device authentication server verifies that the authentication data is acceptable for authentication, an authorization token is returned to the client.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
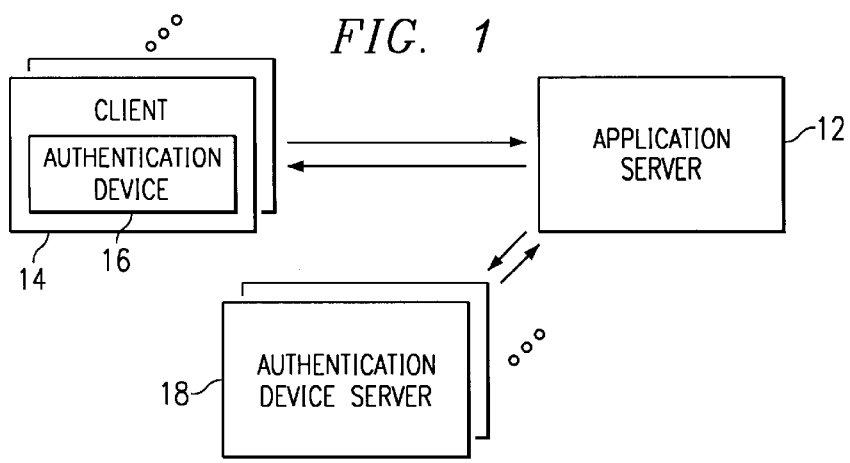
FIG. 1 is a block diagram of the basic components of the authentication framework of the present invention.

FIG. 1 is a high level diagram of the basic components of the inventive authentication framework. The framework 10 includes three (3) basic components: an application server 12, a client 14 having an authentication device 16, and an authentication device server 18. Application server 12 is the primary component and is used to manage and route requests for authentication received by each of the many application clients 14. Each client 14 may have associated therewith a given authentication device 16. The device 16 (which may be a physical device, a software-based process, or both) is one of a plurality of authentication device types managed by the framework. A device type is said to be a "permitted" authentication device type after it is registered with the application server. In this way, new authentication devices or device types are pluggable into the framework.

Each device type typically has its own authentication device server 18. Thus, the framework has multiple authentication device servers 18 associated therewith. A given authentication device server may comprise part of the framework or be an adjunct thereto. As used herein, an authentication device "type" refers to devices that authenticate according to different paradigms (e.g., token cards vs. biometric readers) as well as devices of the same generic functionality provided from different sources (e.g., a first biometric reader from vendor A and a second biometric reader from vendor B).

The authentication devices supported by the framework may be quite varied. Thus, for example, the authentication devices may be conventional devices or schemes based on id/password or cryptographic protocols, or so-called "alternative" authentication devices. Such authentication devices include, for example, "token cards" and "biometric" (e.g., finger, eye or voice print) scanners. Representative token card systems are available commercially from Security Dynamics (SecureID™) and Axent (Defender™). The framework, of course, is not limited to any particular type of authentication device, as an object of this invention is to support any type of authentication device regardless of the authentication protocol.

The invention accomplishes this object by using the application server as a "traffic cop" or router to manage authentication requests from the various clients (having disparate authentication devices). The application server 12 knows what types of devices and device servers it trusts, and the individual device authentication servers preferably have just a simple function (with respect to the inventive scheme), namely, to verify (yes/no) that authentication device data is acceptable for authentication.

Figure 2:
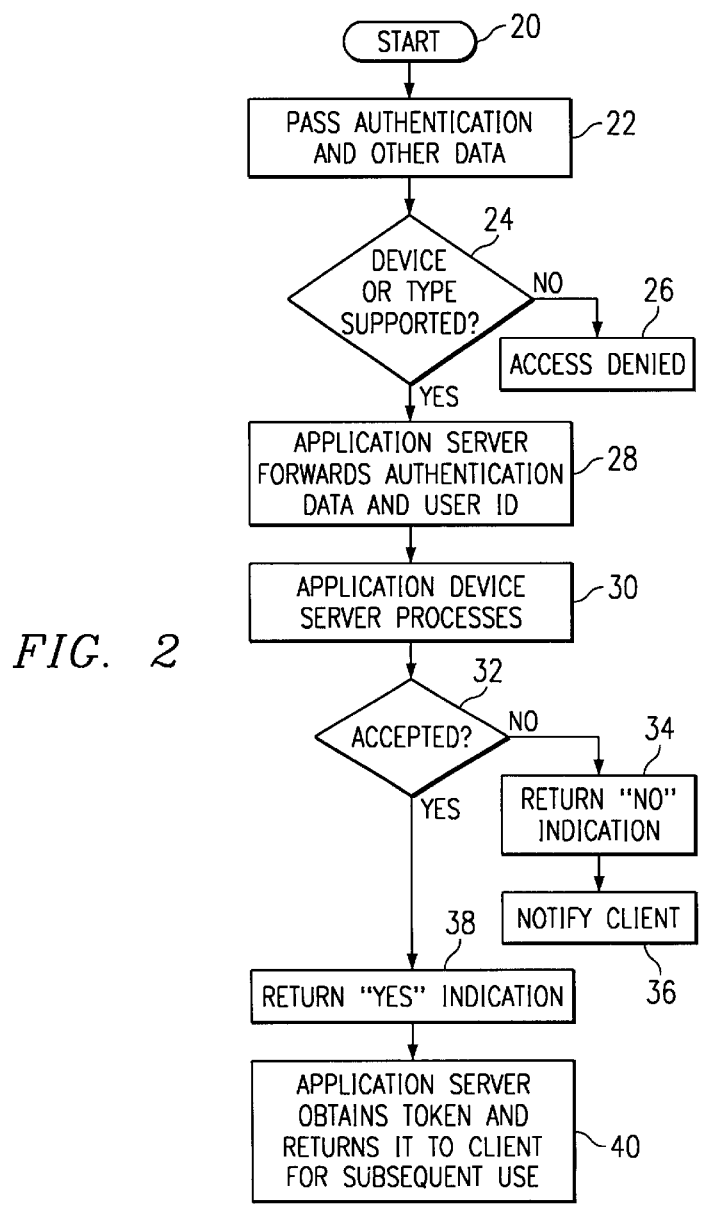
FIG. 2 is a simplified flowchart of a routine for processing a given authentication request.

FIG. 2 is a flowchart illustrating the basic operation of the authentication framework. The routine begins at step 20 after the local authentication device initially processes the user's request. At step 22, the client 14 passes to the application server 12 authentication data from the device 16, as well as other identifying information including a user id. A test is then performed at step 24 to determine whether the authentication device or device type is supported. Typically, an authentication device or device type is supported if there is a device authentication server 18 available to the framework. A given device authentication server 18 typically registers with the application server for this purpose. If the result of the test at step 24 is negative, an appropriate response is returned to the client at step 26 indicating the access is denied. If, however, the result of the test at step 24 indicates that the required device authentication server is supported, the routine continues at step 28. At this time, the application server 12 forwards the authentication data and the user id to the server 16. At step 30, the server 16 processes the authentication data. A test is then done at step 32 to determine whether the authentication data is acceptable. This step may require contacting a separate application authentication server. If the outcome of the test at step 32 is negative, an appropriate message is returned to the application server 12 at step 34. The application server 12, at step 36, then notifies the client that access is denied. If, however, the test at step 32 has a positive result, the routine continues at step 38 to provide this indication to the application server 12. At step 40, the application server 12 obtains an authentication token for the user. This token is then returned to the user at step 42 to complete the processing.

A representative application server 12 is an IBM RS/6000 server comprising a PowerPC processor, the AIX® operating system, and a file or Web server program. A representative client is a personal computer that is x86-, PowerPC®- or RISC-based, that includes an operating system such as IBM® OS/2® or Microsoft Windows '95, and that includes a Web browser. Given device authentication servers typically are vendor-specific.

Figure 3:
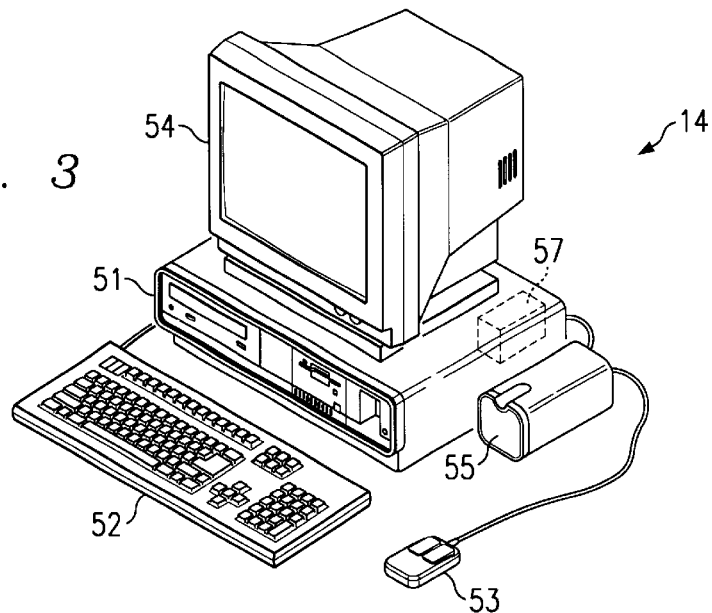
FIG. 3 is a perspective view of a client workstation having an authentication device.

FIG. 3 is perspective view of a representative client machine 14, which is a computer workstation having an alternative authentication device. In this illustration, the computer is a workstation, such as a personal computer running one of many suitable operating systems such as IBM OS/2®, Windows '98 or Windows NT®. One of ordinary skill will appreciate that the computer may also be a notebook computer, a diskless computer, or a pervasive computing device (e.g., a personal digital assistant, smartphone or the like). In this illustration, the computer is controlled by the user using keyboard 52 and mouse 53. Main processing unit 51 houses the mother board providing the main operational aspects of the computer, as well as conventional storage devices (e.g., a hard drive, CD-ROM, floppy drive, etc.). A monitor 54 provides visual display. As also seen, the workstation is configured with a biometric (e.g., fingerprint) scanner 55. As noted above, other authentication devices or schemes may be used instead of biometric reader. One of ordinary skill will appreciate that the particular authentication device, in this case biometric scanner 55, includes an authentication controller 57 (illustrated in phantom). In operation, the authentication device reads or otherwise obtains data appropriate for the method of authentication. As noted above, typically, each authentication device vendor has a different way of encoding such data and validating the user. Thus, according to the invention, information generated by the authentication controller is provided to the authentication framework for further processing as will now be described.

Figure 4:
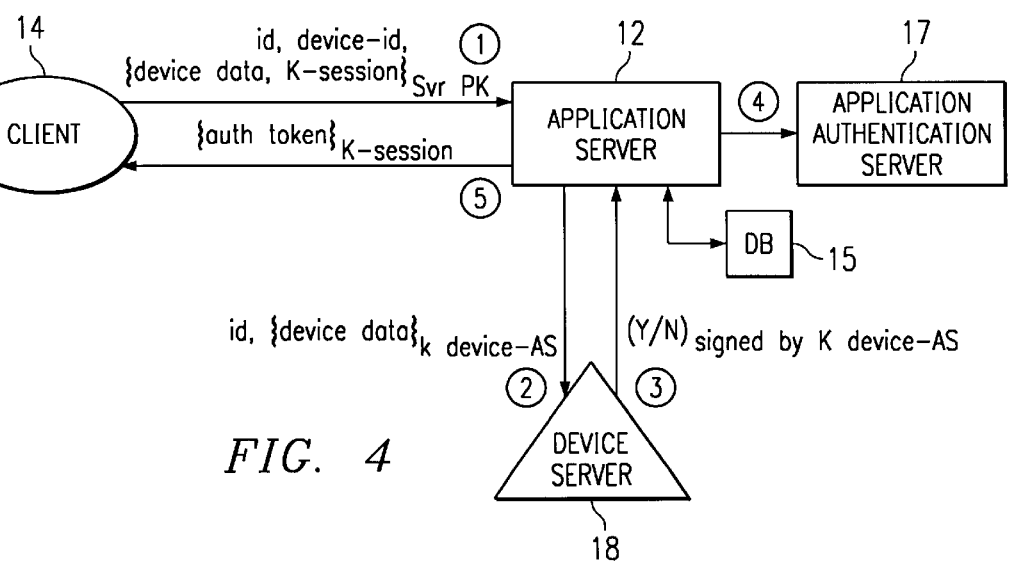
FIG. 4 is a state diagram illustrating in more detail the basic authentication method of the present invention.

FIG. 4 is a state diagram illustrating how the authentication framework is used. It is assumed that the client has obtained the authentication data from its associated authentication device. The manner in which this is achieved, of course, is device-specific. As illustrated in FIG. 4, the client 14 then passes this data, together with a session key, K-session, to the application server 12. Preferably, the device data and the session key pair are encrypted with the application server's public key. The application server has an associated private key that, together with its public key, form a conventional public key cryptosystem. As seen in FIG. 4, preferably the string provided from the client 14 to the application server 12 also includes an identification of the device of device type (the "device-id") as well as what user (the "id") is requesting access. The id and device-id may be part of the encrypted string, if desired.

When the string is received, the application server 12 applies its private key to obtain the device data and the session key. The application server, however, does not perform an authentication function with respect to the data.

Rather, it first determines whether the authentication device or device type of supported by the framework. This evaluation is typically effected by scanning a local database 15 (or by querying a network directory service) to determine if the device or device type has been registered with the framework. In particular, each authentication device may be registered with the framework, in which case a complete list of authentication devices is provided in the database 15. In larger networks, it may not be possible or desirable to maintain a list of all supported devices, in which case the database supports a list of authentication device types (e.g., token card readers, fingerprint readers, voiceprint readers from vendor A, voiceprint readers from vendor B, etc).

If the device or device type is recognized (as part of the framework), the application 12 server re-encrypts the device data with a key and, together with the user id, provides a string (comprising the encrypted device data and id "pair") to a device authentication server 18. The particular device authentication server selected by the application server depends on the authentication device or its type. Typically, the application server 12 and each device authentication server share a given cryptographic protocol. Alternatively, a secure link (e.g., an https connection) may be used. That protocol determines the key value. The id value is provided because, typically, the device authentication server must also know the identity of the user to complete the authentication process.

The device authentication server 18 then verifies the authentication data and provides a simple Yes or No response back to the application server. Preferably, this response is signed (using a conventional digital signature scheme) with the key originally provided by the application server. Upon receipt, the application server processes the response as required and, as a result, knows the user is to be given access. It may then pass an authorization token back to the user, preferably encrypted in the session key.

If necessary, the application server obtains an authentication token from an application authentication server 17 as illustrated. That process is application-specific. After the user is authorized by the application authentication server, the authentication token is returned to the client, preferably encrypted in the session key. This completes the processing.

The above-described scheme thus provide a generic authentication framework. A plurality of device authentication servers are supported by the framework, preferably with at least one server providing authentication services for each type of authentication device supported. This allows any supported device authentication server to verify data from any supported authentication device on the network. The framework makes it easy to add support for new authentication devices by adding an associated authentication device server to the network and propagating the information regarding the new authentication device and server to the application server.

One of ordinary skill will also appreciate that there may be more than one application server. A plurality of such servers may be managed by one or more management servers to provide a robust and scaleable authentication framework for a large network. As discussed above, some or all of the message and response strings required by the inventive protocol may be communicated over a secure link as opposed to using encryption and digital signature schemes.

The present invention provides several advantages over the prior art. The invention provides an authentication framework for use in authenticating clients having a plurality of permitted authentication device types. The architecture enables client-server and Internet-based applications to use alternate authentication devices, e.g., token cards and biometric devices, as well as to integrate conventional authentication schemes such as id/password and crytographic protocols. The inventive framework includes an application server that manages authentication request traffic from a variety of clients having disparate authentication devices or schemes. The application server manages such request traffic without having to verify specific authentication device data, which typically varies depending on the device type and vendor. As a by-product, current and future applications may support varied authentication devices without necessarily having to be rewritten.

Moreover, the inventive framework provides authentication services in a manner that does not depend on or otherwise degrade individual authentication mechanisms. The invention enables new authentication devices or device types to be readily plugged into the framework. Moreover, the described embodiments enable multiple authentication devices to be utilized by an application without providing separate programming for each authentication device. In addition, because authentication data is stored on separate authentication device servers, security is enhanced.

The inventive framework preferably is implemented in software residing on the client, the application server, and the individual authentication device servers. The given functions described above thus may be implemented as a set of instructions (program code) in a code module resident in the random access memory of the computer. Until executed by the computer's processor, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, the term "server" should also be broadly construed to mean a computer, computer platform, an adjunct to a computer or platform, or any component thereof. Of course, a "client" should be broadly construed to mean one who requests or gets the file, and "server" is the entity which downloads the file.

What is claimed is:

1. A method for authenticating clients, each of which is coupled to an authentication device of one of a plurality of permitted authentication device types, comprising the steps of:

passing requests for authentication to an application server, each request including information identifying a client, an authentication device coupled thereto, and authentication data;

in response to a determination at the application server that a request originates from a recognized authentication device type, passing the authentication data from the application server to an authentication device server capable of authenticating the data; and responsive to a positive authentication by the authentication device server, returning an authorization from the application server back to the client.

2. The method as described in claim 1 further including the step of:
   having the application server obtain the authorization from an application authentication server.

3. The method as described in claim 1 further including the step of having a new authentication device server register with the application server.

4. The method as described in claim 3 wherein the new authentication device server is used to authenticate data originated from a new authentication device type.

5. The method as described in claim 1 wherein the authentication device is a token card.

6. The method as described in claim 1 wherein the authentication device is a biometric scanner.

7. The method as described in claim 1 wherein the authentication device requires verification of a user password.

8. The method as described in claim 1 wherein the requests are passed to and from the application server using one or more cryptographic protocols.

9. The method as described in claim 1 wherein the requests are passed to and from the application server over secure communication links.

10. A method for authentication, comprising:
    registering a set of authentication device servers with an application server, each of the authentication device servers useful for verifying authentication data from a given authentication device type;
    passing requests for authentication to the application server, each request including information identifing a client, an authentication device coupled thereto, and authentication data;
    passing the authentication data from the application server to a given one of the set of authentication device servers capable of authenticating the data; and
    responsive to a positive authentication by the authentication device server, returning an authorization from the application server to the client.

11. The method as described in claim 10 further including the step of:
    having the application server obtain the authorization from an application authentication server.

12. The method as described in claim 10 wherein the requests are passed to and from the application server over secure communication links.

13. The method as described in claim 10 further including the step of registering a new authentication device server.

14. The method as described in claim 13 wherein the new authentication device server is used to authenticate data originated from a new authentication device type.

15. The method as described in claim 10 wherein the requests are passed to and from the application server using one or more cryptographic protocols.

16. An authentication framework, comprising:
    a set of clients, each of which is coupled to an authentication device of one of a plurality of permitted authentication device types;
    a set of authentication device servers, each of which is useful for verifying authentication data from one of the permitted authentication device types; and
    an application server (a) for receiving a request for authentication from a client, wherein the request includes information identifying a client, an authentication device coupled thereto, and the authentication data, (b) for routing authentication data in the request to a given one of the authentication device servers in accordance with the information included in the request for identifying an authentication device, and (c) responsive to a positive authentication by the authentication device server, for returning an authorization back to the client.

17. The authentication framework as described in claim 16 wherein each authentication device server registers with the application server.

18. The authentication framework as described in claim 16 wherein the request is passed to the application server and the authorization is returned to the client using a cryptographic protocol.

19. The authentication framework as described in claim 16 further including an application authentication server for providing the authorization according to an application-specific protocol.

20. A computer program product in a computer-readable medium for controlling an authentication framework, comprising:
    means for receiving a request for authentication from a client at an application server, the client coupled to an authentication device of one of a plurality of permitted authentication device types, each request including information identifying a client, an authentication device coupled thereto, and the authentication data;
    means for routing authentication data in the request to a given one of a set of authentication device servers in response to a determination at the application server that a request originates from a recognized authentication device type, each authentication device server being useful for verifying authentication data from one of the plurality of permitted authentication device types; and
    means responsive to a positive authentication by the given one of the set of authentication device servers for returning an authorization from the application server back to the client.

21. The computer program product as described in claim 20 further including means for obtaining the authorization from an application authentication server in accordance with an application-specific protocol.

22. The computer program product as described in claim 20 further including means for registering a set of authentication device servers with the application server.

23. The method as described in claim 1 further comprising:
    searching a database by the application server based on the information included in the request for identifying an authentication device; and
    recognizing an authentication device type if matching information is found in the database.

24. The method as described in claim 1 further comprising:
    querying a network directory service by the application server based on the information included in the request for identifying an authentication device; and
    recognizing an authentication device type if matching information is found in the database.

* * * * *